Sept. 27, 1949.　　　　D. C. KIRBY, JR　　　　2,482,780
STEMLESS VALVE

Filed June 18, 1946　　　　　　　　　　2 Sheets-Sheet 2

Inventor
DAVIS C. KIRBY, JR.

By MQHayes

Attorney

Patented Sept. 27, 1949

2,482,780

UNITED STATES PATENT OFFICE 2,482,780

STEMLESS VALVE

Davis C. Kirby, Jr., United States Navy

Application June 18, 1946, Serial No. 677,468

5 Claims. (Cl. 277—26)

(Granted under the act of March 3, 1883, as amended April 30, 1928; 370 O. G. 757)

This invention relates to valves and more particularly to an improved construction of a leakproof stemless valve.

Heretofore various valve constructions have been proposed wherein valve stems bearing handles were employed to operate the valve opening and closing mechanism and in which efforts have been made to seal or pack the stem to minimize leakage. Such prior constructions have been unsatisfactory for many reasons.

The present invention embodies a valve member comprising a portion of a fluid conduit and a suitable housing which may be bodily grasped by the user and operated to move the valve parts into open or closed position.

It is therefore an object of the present invention to provide such a proposed construction which may readily be used in the fluid flow line for manual manipulation to seat or unseat the valve parts.

A further object of the present invention is to provide a trouble-free leakproof stemless valve construction wherein the associated enclosed parts are simple in design and may readily be assembled for long, trouble-free operation.

Still another object of the present invention is to provide a valve construction which will occupy a minimum amount of space and which includes an outer housing which may be manually grasped and bodily rotated to effect the valve opening and closing function.

Figure 1:
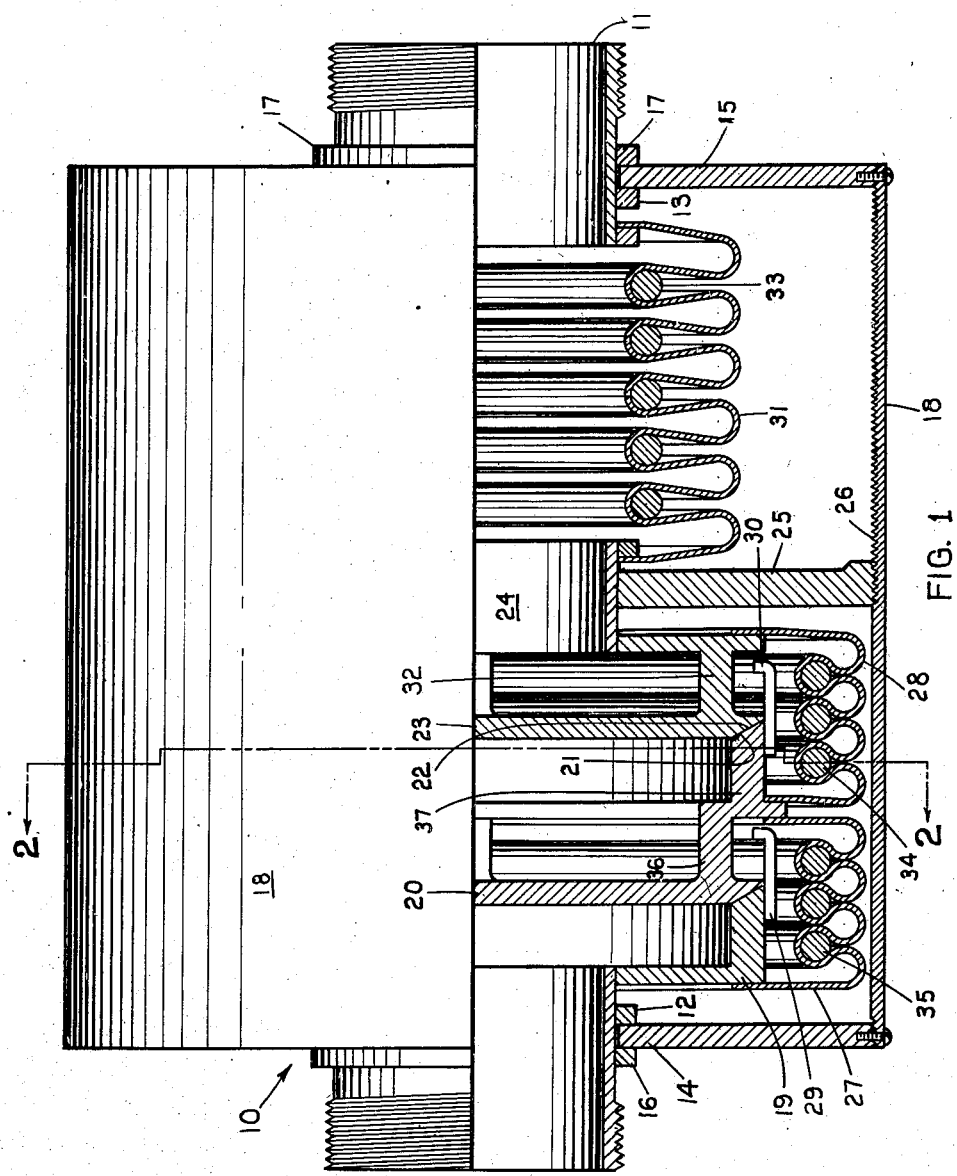
Figure 2:
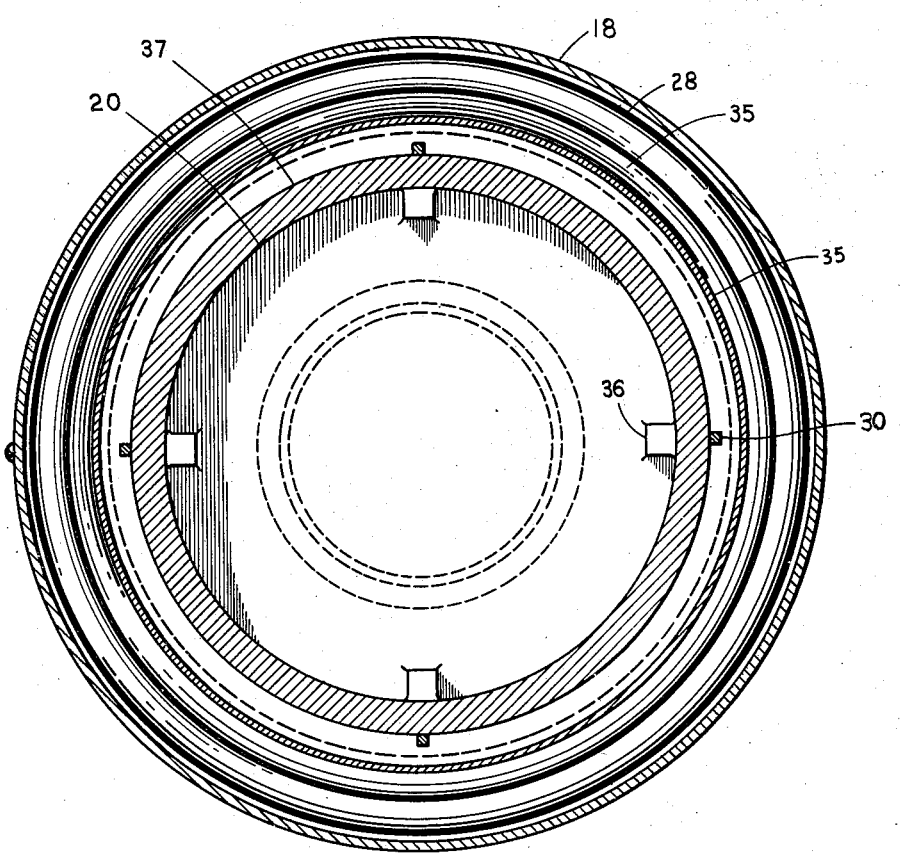

Additional objects and advantages will be apparent from the following specification and appended drawings, in which latter Fig. 1 is a side elevation, partially in section, of a valve constructed in accordance with one method of the present invention; and Fig. 2 is a transverse sectional view of the embodiment illustrated in Fig. 1 taken along a line substantially corresponding to line 2—2 of Fig. 1.

Referring to the drawings in detail, the embodiment illustrated comprises fluid conducting end members 10 and 11 which may be internally or externally threaded or otherwise suitably machined so that they may be coupled to the pipe through which fluid flow is sought to be controlled. The members 10 and 11 may be provided with shoulders 12 and 13 against which may abut the inner surfaces of end plates 14 and 15. These plates are retained in a rotatable manner against the shoulders 12 and 13 by any suitable means, such as the fastening rings 16 and 17. Of course, instead of the friction side engagement illustrated, any suitable bearing means may be employed to reduce the friction at this point and permit more free rotation of the end plates 14 and 15.

A housing or casing 18 in the form of an enlarged cylinder may be secured at each end to the end plates 14 and 15, as by means of appropriate threads and screws as illustrated, so that the end members and the housing may be bodily rotated as a unit.

To the inner end of the pipe member 10 may be secured a valve seat member 19 which is stationary and cooperates with a complementary movable valve head 20 to open and close a passage for fluid flow through the valve. The valve head 20 is of a floating construction and is connected to a cylindrical portion 31 by integral posts 36, whereby it is guided in its movement by certain bellows and limit stop arrangements as hereinafter described. This valve 20 has at the opposite end of cylinder 31 a seat area 21 which is complementary to and cooperates with the seat area 22 of another movable valve head 23. The valve head 23 is centrally apertured at 24 to permit fluid flow and is secured to a radially extending web 25, the periphery of which is threaded to engage with the complementary thread 26 within the manually rotatable housing 18. These threads 26 extend to the end of the housing 18 to facilitate insertion of the second valve head during assembly.

As hereinbefore mentioned certain metallic bellows 27 and 28 are provided to seal the valve head and valve seat in movable relationship, which bellows permit axial movement of both of the valve heads during the opening and closing movements of the valve. To limit the movement of the valve head, suitable stops 29 and 30 may be provided and in the embodiment illustrated these are formed from wire or rod members and at one end each has an in-turned head which is located in the path of movement of the adjacent valve head and serves to limit its movement. In addition the valve head stops 29 and 30 assemble in rotation the parts in a coaxial relationship.

The large bellows 31 permit considerable axial movement of the second valve head 23 during the valve opening and closing movement. As illustrated in Fig. 2 the second valve head 23 may include a number of axially extending posts 32 which leave a free intermediate space for the flow of fluid through the valve seat.

In the embodiment illustrated the valve has been adapted for the handling of fluid under pressure and therefore there is provided at the base of each convolution of the bellows and around the outside of the bellows a number of spaced rings 33, 34 and 35, the rings reinforcing the bellows structure according to the internal pressure conditions which may be encountered. It will be apparent that in the use of this valve in lines where the internal pressure is less than atmospheric pressure (i. e. vacuum) the rings 33, 34 and 35 may be installed within the bellows in the outermost convolutions thereof.

In use, this device may be installed in a fluid pressure line in a manner similar to the conventional valve constructions whereby the threaded portion of end members 10 and 11 may be suitably coupled to the line to provide a fluid seal. Thereupon, with the valve closed, and the double seats 19—20 and 21—22 in closed position, fluid flow through the valve is effectively prevented. In order to open the valve the housing 19 is manually 18 is manually grasped and bodily rotated about its center as an axis. This rotation is permitted by the manner in which the end plates 14 and 15 are secured to the end conduit members 10 and 11 as aforesaid. Upon bodily rotation of the housing 18 the web 25, which is externally threaded within the interior of the housing 18 and is retained stationary by its connection with the associated parts, is caused to move axially, which movement is accommodated by the bellows 31 so that no leakage there occurs and the movement bears with it the second valve head 23 so that it moves axially away from the valve head 20 and separates the seats 21 and 22. This permits fluid flow to pass between the spaced posts 32 and between the seats 21 and 22 to the still closed seats 19 and 20.

Continued rotation of the housing 18 moves the web 25 and associated structures to the right, widening the gap between seats 21 and 22 until, at the limit of control, the edge of seat 22 strikes the undersurface of the in-turned head on stop 30, and thereafter, continues rotation of the housing carrying the valve head 20 to the right, separating the seat portions 19 and 20 and permitting the fluid to thus pass between and on out through the fluid conduit 10.

It will be apparent that leakage during the above operation is effectively prevented by the bellows 27 and 28 which are connected to the relatively movable parts to accommodate axial movement thereof and since they are securely fastened as by solder at each end there is no possibility of a leakage at this point.

It will readily be apparent that with a construction of the character hereinsetforth wherein the assembled parts are at all times assembled within seals, flexible metallic bellows members the possibility of a leakage is effectively prevented and the difficulty encountered with prior stem valve types are overcome.

Of course, if desired, a single valve head may be employed for applicant's purpose or if even greater sealed positive flow control is essential even more valve heads may be used than is herein used. Such additional valve heads being coupled in the manner illustrated by manual operation of the housing 18. Of course, where desired the housing 18 may have an outer surface which is knurled or otherwise machined to enable it easily to be grasped and operated or in some instances it may be desirable to use a separate prime mover suitable for the purpose of rotating this housing.

While a particular embodiment of the invention is shown, it will be understood, of course, that it is not desired to be limited thereto since many modifications may be made, and it is therefore, contemplated by the appended claims to cover any such modifications as fall within the true spirit and scope of this invention.

The invention described herein may be manufactured and used by or for the Government of the United States of America for governmental purposes without the payment of any royalties thereon or therefor.

What I claim as new is:

1. A fluid flow control device comprising a fluid inlet, a fluid outlet, a flow control valve disposed between said inlet and said outlet, said valve including a seat portion and a relatively movable plug member, the plug being non-rotatably secured for separation and approachment, a flexible bellows sealing means enclosing the relatively movable parts in hermetically sealed relationship, and a casing surrounding said valve and valve sealing members, said casing being bodily rotatable to move the separable portions into and out of engagement.

2. A fluid flow control member comprising a pair of open ended coupling conduits, and fluid flow control means therebetween, said fluid flow control means including a seat portion, a plug portion having seating means complementary to the seat, one of said portions being connected to one of said coupling conduits, a casing surrounding the fluid flow control means, means connecting the casing to the plug portion for imparting a movement to the plug to and from the seat upon bodily rotation of the casing whereby fluid flow is controlled, and flexible bellows sealing means secured to and enclosing the relatively movable seat and plug members.

3. A fluid flow control member comprising a fluid inlet, a fluid outlet, and fluid flow control means therebetween, said fluid flow control means including a seat portion, a plug portion having seating means complementary to the seat, a casing surrounding the fluid flow control means, a means connecting the casing to one of the seat and plug portions for imparting a movement to the plug to and from the seat upon bodily rotation of the casing whereby fluid flow is controlled, and a flexible sealing skirt housed by said casing and having its ends secured to the relatively movable plug and seat portions.

4. A fluid flow control member comprising a pair of spaced open ended coupling conduits, a casing inter-connecting the conduits and journalled for rotation thereon, a fluid control mechanism including a valve seat within the casing and in communication with the conduits to control fluid flow therethrough, the valve seat being secured in communication with one of the coupling members, a valve member movable to and from the seat, said valve member having a second seat joined thereto, a second valve positioned to engage the second seat, the second valve being axially movable to and from the second seat, operating means connecting the casing with the second valve for opening and closing movement thereof by bodily rotation of the casing, and means for actuating said valve member after a predetermined opening movement of said second valve.

5. A fluid flow control member comprising a pair of open ended coupling conduits, and fluid flow control means therebetween, said fluid flow control means including a seat portion, a plug portion having seating means complementary to the seat, one of said portions being connected to one of said coupling conduits, a casing surrounding the fluid flow control means, means connecting the casing to the plug portion for imparting a movement to the plug to and from the seat upon bodily rotation of the casing whereby fluid flow is controlled, flexible bellows sealing means secured to and enclosing the relatively movable seat and plug portions, and additional flexible bellows sealing means connecting the fluid flow control means to the other of said coupling conduits.

DAVIS C. KIRBY, JR.

REFERENCES CITED

The following references are of record in the file of this patent:

UNITED STATES PATENTS

| Number | Name | Date |
| --- | --- | --- |
| 1,150,641 | Smith | Aug. 17, 1915 |
| 2,210,559 | Albright | Aug. 6, 1940 |
| 2,302,089 | Aller | Nov. 13, 1942 |